(12) United States Patent
Kezys

(10) Patent No.: US 7,774,000 B2
(45) Date of Patent: Aug. 10, 2010

(54) LOADING CONTROL METHODS AND APPARATUS FOR WIRELESS ACCESS POINTS OF WIRELESS LOCAL AREA NETWORKS IN SUPPORT OF LEGACY TERMINALS

(75) Inventor: Vytautas Robertas Kezys, Hamilton (CA)

(73) Assignee: Research In Motion Limited, Waterloo, Ontario (CA)

( * ) Notice: Subject to any disclaimer, the term of this patent is extended or adjusted under 35 U.S.C. 154(b) by 764 days.

(21) Appl. No.: 11/669,719

(22) Filed: Jan. 31, 2007

(65) Prior Publication Data

US 2008/0181184 A1 Jul. 31, 2008

(51) Int. Cl.
G06F 15/16 (2006.01)
(52) U.S. Cl. ........................................ 455/453; 370/338
(58) Field of Classification Search ................. 370/330, 370/338, 342, 348; 455/69, 422.1, 434, 442, 455/445, 450, 522
See application file for complete search history.

(56) References Cited

U.S. PATENT DOCUMENTS

| | | | |
|---|---|---|---|
| 5,504,938 | A | 4/1996 | Redden |
| 7,313,409 | B2 | 12/2007 | Iacono et al. |
| 7,346,314 | B2 | 3/2008 | Tsai et al. |
| 2002/0111183 | A1 | 8/2002 | Lundby |
| 2005/0152320 | A1* | 7/2005 | Marinier et al. ............. 370/338 |
| 2005/0153702 | A1 | 7/2005 | Cuffaro et al. |

FOREIGN PATENT DOCUMENTS

| | | |
|---|---|---|
| DE | 202005000109 U1 | 7/2005 |
| EP | 0615395 A1 | 11/1993 |
| WO | 9212601 A1 | 7/1992 |

OTHER PUBLICATIONS

European Search Report for EP Application # 07101470.8, Dated Jun. 25, 2007.
European Search Report and Written Opinion, July 17, 2008, 07101470.8.

* cited by examiner

*Primary Examiner*—Sam Bhattacharya
(74) *Attorney, Agent, or Firm*—John J. Oskorep, Esq.

(57) ABSTRACT

Methods and apparatus for use in controlling the loading of wireless access points (APs) in a wireless local area network (WLAN) in support of legacy terminals are disclosed. The WLAN has at least a first AP and a second wireless AP adjacent the first wireless AP. An indication which indicates whether a loading of the second wireless AP is greater than a predetermined threshold is identified. When the indication indicates that the loading is greater than the predetermined threshold, a first nominal radio frequency (RF) transmission power of the first wireless AP is increased in order to increase a first RF coverage area of the first wireless AP. A second nominal RF transmission power of the second wireless AP is correspondingly reduced in order to reduce a second RF coverage area of the second wireless AP. In response, some of the mobile communication devices initially operating with the second wireless AP are switched to operate with the first wireless AP in order to reduce the loading of the second wireless AP. The techniques may be embodied in a centralized approach where transmission control equipment of the WLAN controls each wireless APs in this manner, or alternatively in a distributed non-centralized approach where each wireless AP acts independently and autonomously in the same or similar manner. Preferably, the techniques do not require the functional requirements of mobile devices to modified and therefore are suitable for use with existing legacy devices.

14 Claims, 6 Drawing Sheets

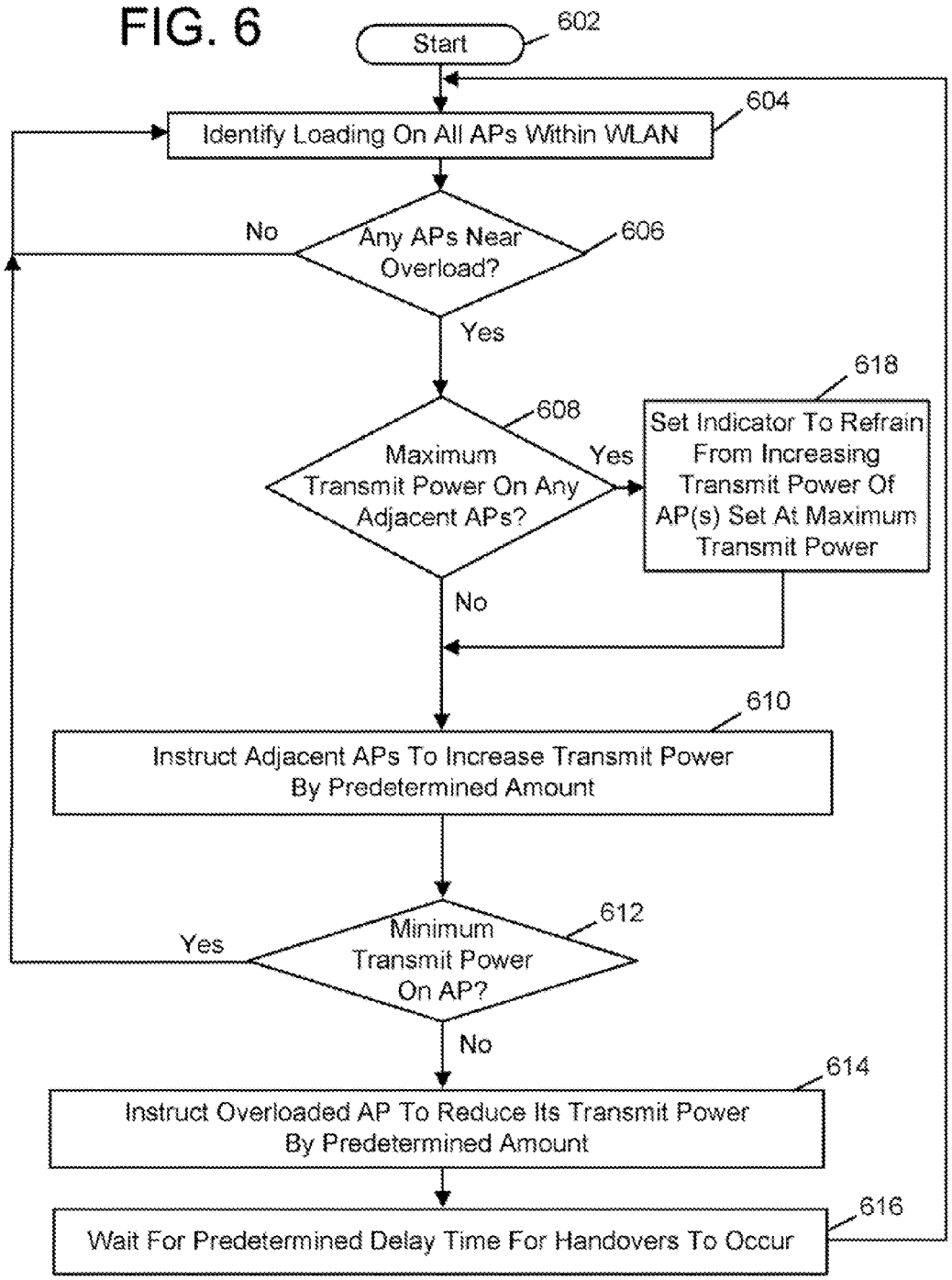

LOADING CONTROL METHODS AND APPARATUS FOR WIRELESS ACCESS POINTS OF WIRELESS LOCAL AREA NETWORKS IN SUPPORT OF LEGACY TERMINALS

BACKGROUND

1. Field of the Technology

The present disclosure relates generally to communications in wireless local area networks (WLANs), and more particularly to load control methods and apparatus for wireless APs of WLANs in support of legacy terminals which prevents excessive loading on any AP so that quality of service is not compromised.

2. Description of the Related Art

In wireless communication networks, such as wireless local area networks (WLANs) which operate in accordance with 802.11-based standards, wireless access points (APs) are configured to communicate with a number of mobile communication devices which request service as a client. Each AP has a limited amount of usable capacity for handling communication information, however, beyond which communications is compromised. When the usable capacity of an AP is reached due to a large traffic load to/from clients accessing the WLAN through the AP, system adjustments may need to be made by limiting data rates to/from selected clients or to every client equally in order to provide the appropriate service to all requesting clients. This is undesirable, as the quality of service (QoS) for a given client may he unnecessarily compromised. If measures are not appropriately taken, however, data throughput will suffer.

Accordingly, what are needed are methods and apparatus for APs in WLANs to prevent or otherwise reduce the likelihood of overloaded AP conditions so that a high quality of service is maintained in the WLAN. Preferably, such methods and apparatus should accommodate existing legacy client terminals without requiring changes thereto.

BRIEF DESCRIPTION OF THE DRAWINGS

Embodiments of the present disclosure will now be described, by way of example only, with reference to the attached figures. Same reference numerals are used in different figures to denote similar elements.

FIG. 6 is a flowchart for describing a method for use in configuring a WLAN with a load control mechanism using a centralized approach.

DETAILED DESCRIPTION OF THE PREFERRED EMBODIMENTS

Methods and apparatus for use in controlling the loading of wireless access points of a wireless local area network (WLAN) in support of legacy terminals are disclosed. The WLAN has at least a first wireless access point (AP) and a second wireless AP adjacent the first wireless AP. An indication which indicates whether a loading of the second wireless AP is greater than a predetermined threshold is communicated in the WLAN. When the indication indicates that the loading is greater than the predetermined threshold, a first nominal radio frequency (RF) transmission power of the first wireless AP is increased in order to increase a first RF coverage area of the first wireless AP. A second nominal RF transmission power of the second wireless AP is correspondingly reduced in order to reduce a second RF coverage area of the second wireless AP. In response, some of the mobile communication devices initially operating with the second wireless AP are switched to operate with the first wireless AP in order to reduce the loading of the second wireless AP. The techniques may be embodied in a centralized approach where transmission control equipment of the WLAN controls each wireless APs in this manner, or alternatively in a distributed non-centralized approach where each wireless AP acts independently and autonomously in the same or similar manner. Preferably, the techniques do not require the functional requirements of mobile devices to modified and therefore are suitable for use with existing legacy mobile devices. Other additional inventive techniques to efficiently achieve such results are described as well.

Figure 1:
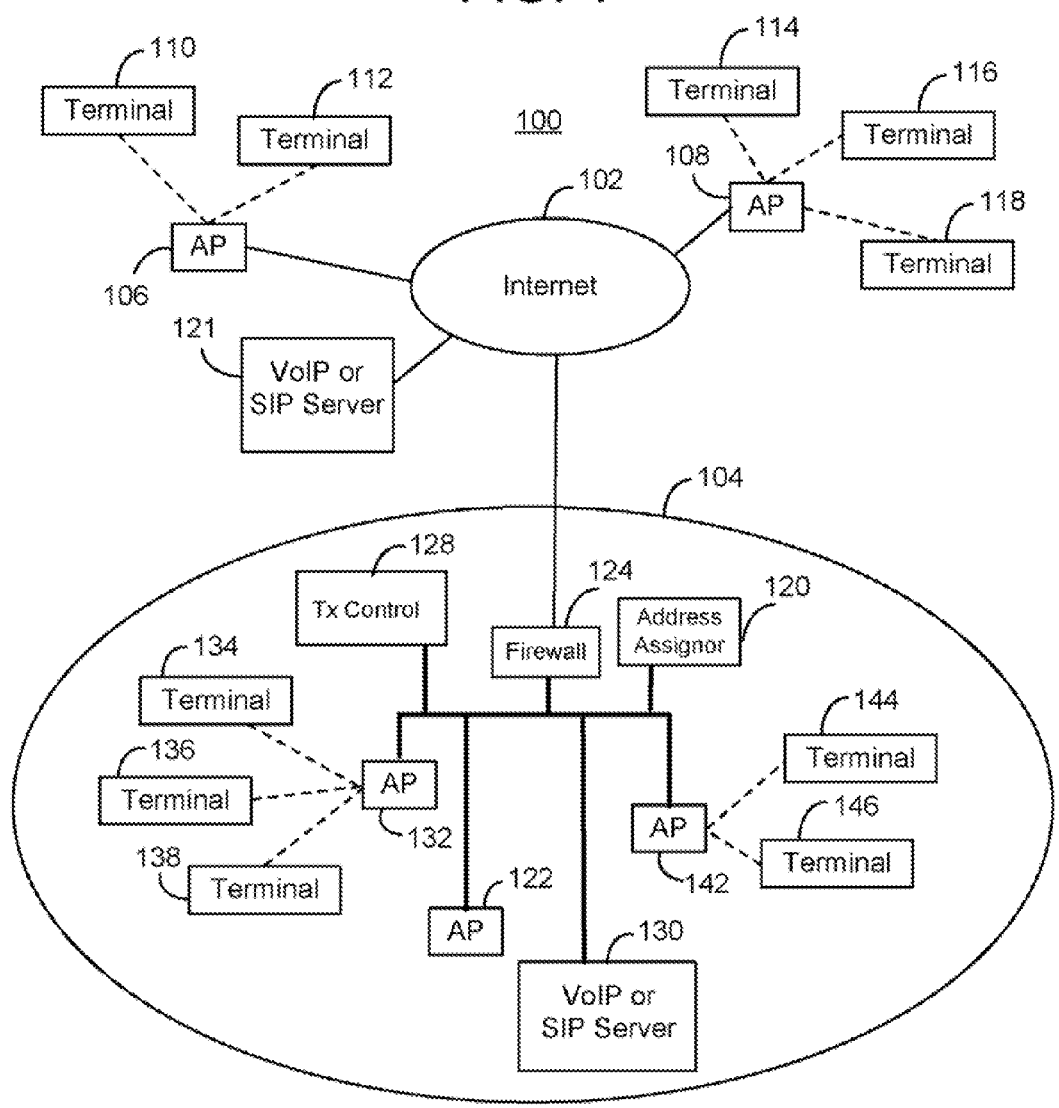
FIG. 1 is a block diagram which illustrates a communication system which includes a plurality of mobile communication devices and one or more wireless communication networks (e.g. wireless local area networks or WLANs)

To illustrate basic network architecture, FIG. 1 is a block diagram which illustrates a communication system 100 which includes a public network 102 (e.g. the Internet) and a private network 104, In the present embodiment, private network 104 is or includes a wireless local area network (WLAN). In the WLAN, terminals may connect to their associated networks through access points (APs) as shown. Preferably, at least some of the APs are wireless APs of the WLAN and at least some of the terminals are mobile/wireless communication devices which interface and connect through these wireless APs. Such terminals and APs may operate in accordance with well-known IEEE 802.11 standards. The terminals shown in public network 102 include terminals 110 and 112 which have interfaced with AP 106, and terminals 114, 116, and 118 which have interfaced with AP 108. The terminals shown in private network 104 include terminals 134, 136, 138 which have interfaced with AP 132, and terminals 144 and 146 which have interfaced with AP 142.

Private network 104 which includes the WLAN provides various data and communication services to its terminals. For example, private network 104 may provide for voice telephony communication services for its terminals with use of Voice over IP (VoIP) communications. For these types of services, private network .104 may utilize a VoIP server architecture for VoIP communication sessions, and/or an e-mail server architecture for e-mail message communications, as examples. For these purposes, communication system 100 may also include a VoIP or Session Initiation Protocol (SIP) server. In the present embodiment, communication system 100 has a VoIP or SIP server 121 in public network 102 and a VoIP or SIP server 130 in private network 104. Note that some communication applications utilized by terminals, such VoIP applications, require the use of SIP. SIP is well-documented In standard documents such as Request For Comments (RFC) 3261. A firewall 124 may also be provided in private network 104 for preventing unauthorized access from users in public network 102.

If a centralized approach is used for load control techniques in the WLAN, private network 104 may also have a transmit control server 128 which assists in controlling RF transmit power levels on wireless APs to reduce loading on nearly-overloaded wireless APs, which is described in more detail below. Transmit control server 128 is one type of transmission control equipment of the WLAN which may be utilized for techniques of the present disclosure. The transmission control equipment may have any suitable type of network interface for coupling or connecting to private network 104. If utilized, transmit control server 128 may have a transmit control server database (not shown) which contains AP RF transmit power level and client loading information that is pertinent for reducing loading on nearly-overloaded wireless APs. Transmit control server 128 and Its database are described in more detail below in relation to FIGS. 3-7.

Figure 2:
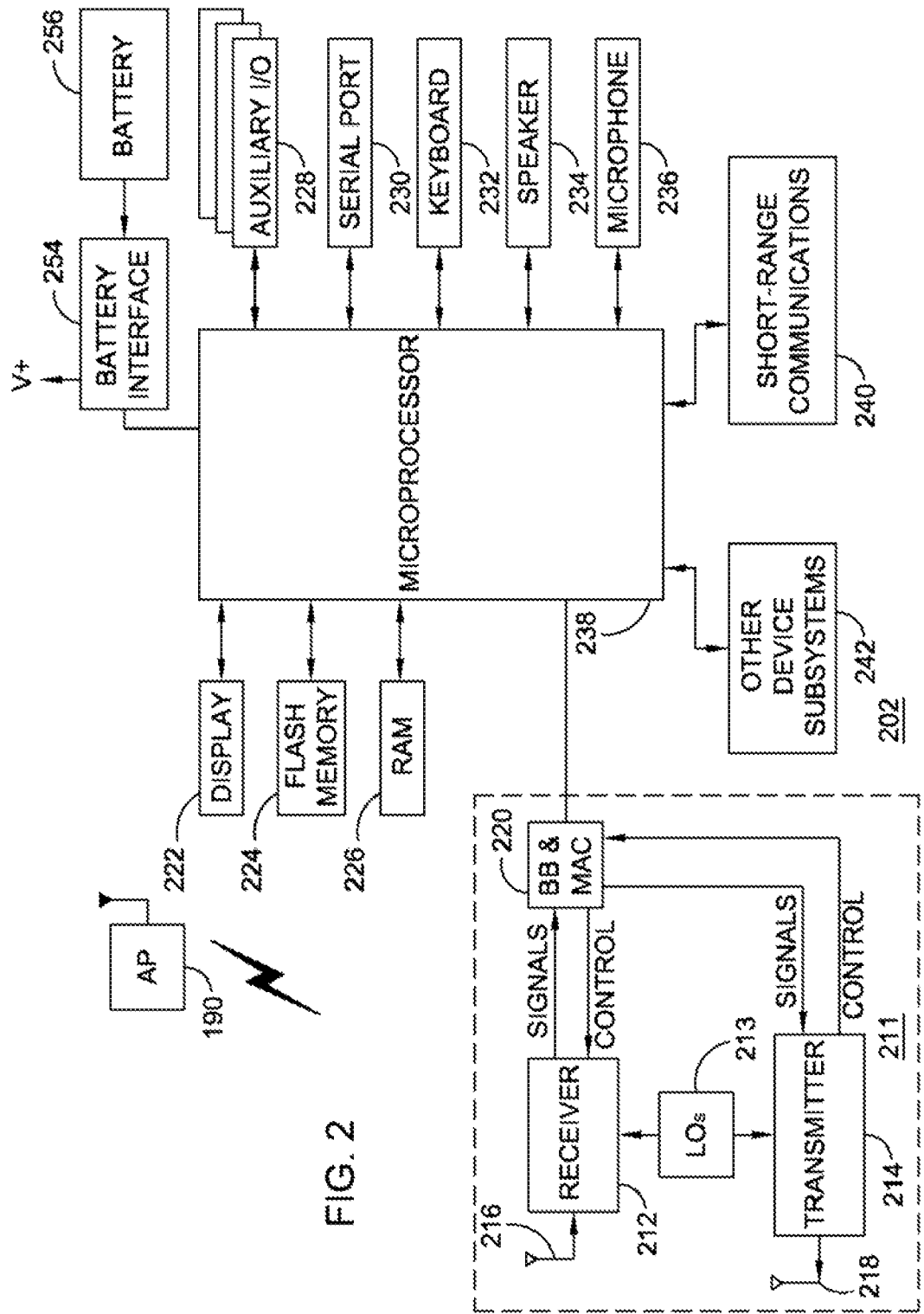
FIG. 2 is a more detailed schematic diagram of the mobile communication devices of FIG. 1, namely, a mobile station of the preferred embodiment.

Referring now to FIG. 2, electrical components of a typical mobile station (MS) 202 (one type of mobile communication device) which operates with wireless APs of communication system 100 of FIG. 1 will be described. Mobile station 202 is preferably a two-way communication device having at least voice and advanced data communication capabilities, including the capability to communicate with other computer systems. Also preferably, mobile station 202 is a wireless communication device which operates in accordance with IEEE 802.11 standards. Depending on the functionality provided by mobile station 202, it may be referred to as a data messaging device, a two-way pager, a cellular telephone with data messaging capabilities, a wireless Internet appliance, or a data communication device (with or without telephony capabilities).

As shown in FIG. 2, mobile station 202 is adapted to wirelessly communicate with AP 190 which may be a wireless AP of the present disclosure. For communication with AP 190, mobile station 202 utilizes communication subsystem 211. Depending on the type of device, mobile station 202 may also be adapted to wirelessly communicate with other systems such as cellular telecommunication systems. With such configuration, mobile station 202 may be referred to as a "dual mode" mobile station. Although mobile station 202 may have separate and independent subsystems for these purposes, at least some portions or components of these otherwise different subsystems may be shared where possible.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile station 202 is intended to operate. In the present disclosure, communication subsystem 211 (including its associated processor/processing components) is operative in accordance with IEEE 802.11 standards.

Mobile station 202 may send and receive communication, signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion, A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile station 202 is a portable battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) that provides power V+ to all of the circuitry.

Mobile station 202 includes a microprocessor 238 (one type of processor or controller) that controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores may also be available on mobile station 202 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile station 202 with respect to such items. This is especially advantageous where the host computer system is the wireless device user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice calk or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile station 202 has just been described, any suitable mobile communication device or terminal may be part of the inventive methods and apparatus which will be described in fuller detail below. Note that many components of mobile station 202 shown and described may not be included (e.g. a full QWERTY keypad may be optional).

The present disclosure relates to load control methods and apparatus for wireless APs in WLANs in order to prevent, excessive loading on any wireless AP so quality of service is not compromised.

According to the present disclosure, a nearly-overloaded wireless AP (e.g. wireless AP 132 of FIG. 1) is configured to transmit at a lower power, which will effectively decrease its RF coverage area, while neighboring wireless APs (e.g. wireless APs 122 and 142 of FIG. 1) are configured to transmit at a higher power, effectively increasing their RF coverage area. For simplicity, the wireless AP that is nearly overloaded will be referred to as being "overloaded" or as the overloaded wireless AP. The transmission control technique is performed in order to provide service to some of the clients on the overloaded AP to the neighboring wireless APs, to thereby reduce client loading on the overloaded wireless AP. If a centralized approach Is utilized, a network server (e.g. transmit control server 128 of FIG. 1) of the network may be configured to control RF transmit power levels on wireless APs to reduce loading on overloaded wireless APs. Without provisions for reducing the load on overloaded wireless APs, present technology will compromise AP service provided by decreasing data rate and/or limiting usable bandwidth to each mobile communication device receiving client services on that wireless AP.

Figure 3:
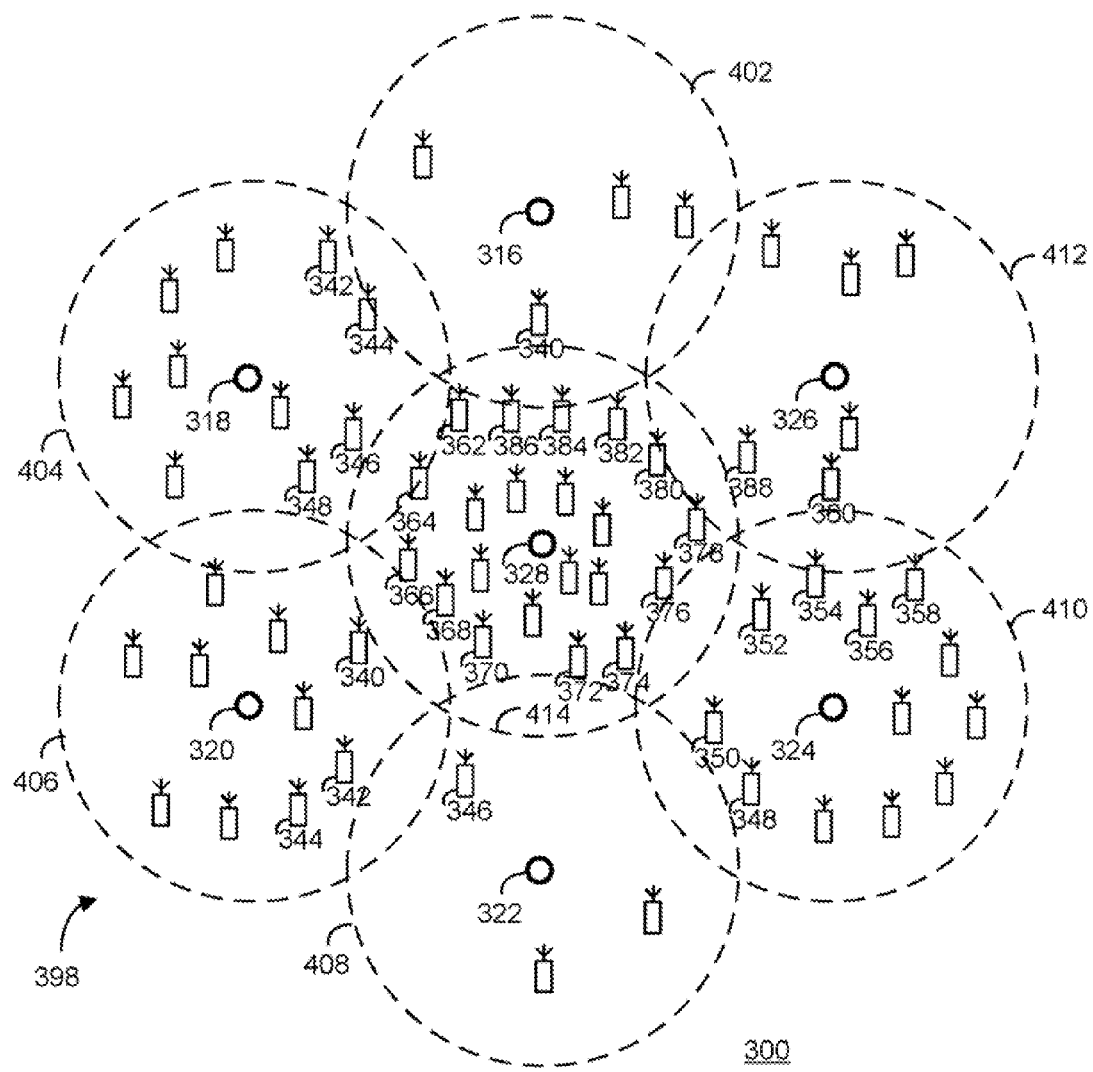
FIG. 3 is a first in a series of three illustrations of FIGS. 3-6 of a WLAN RF coverage map, where each wireless AP RF coverage area is shown as having overlapping regions with each adjacent or neighboring AP RF coverage area, and where a central wireless AP of the WLAN is nearly overloaded.
Figure 4:
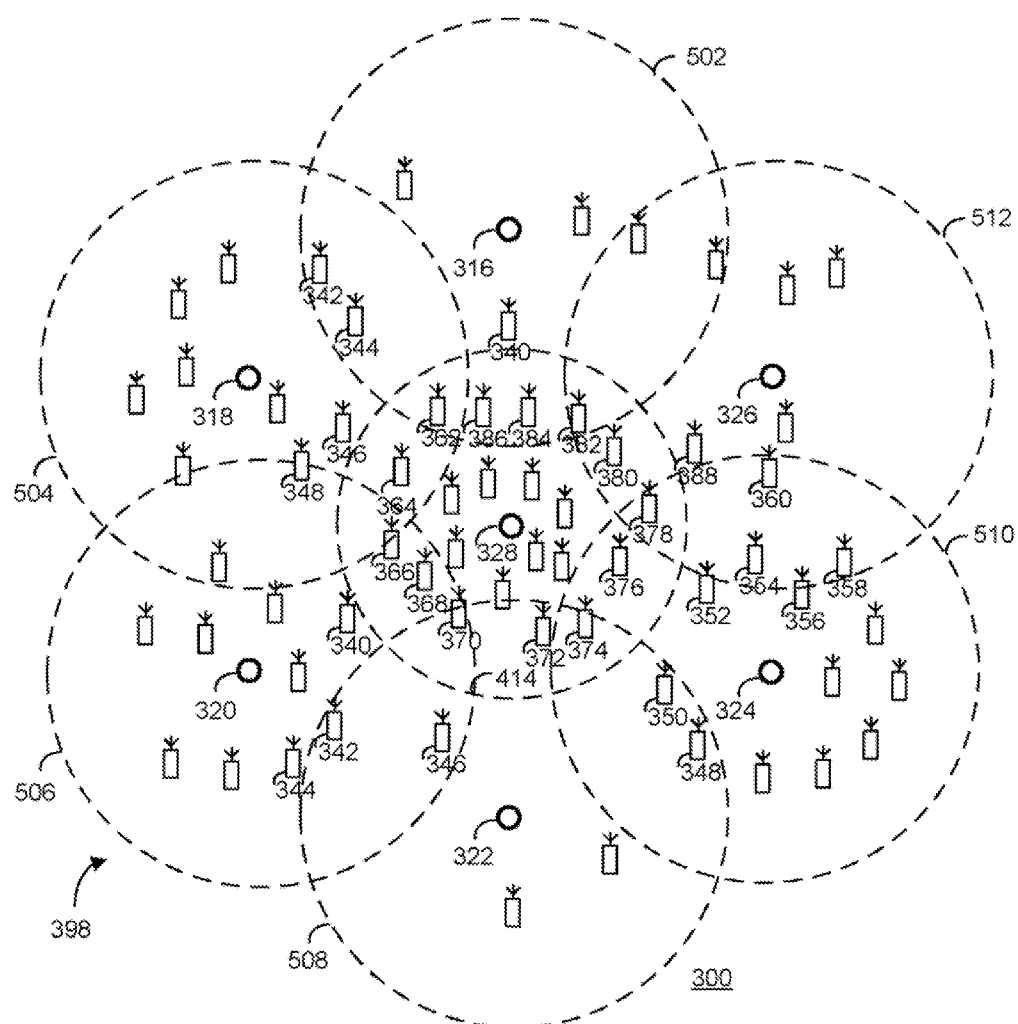
FIG. 4 is a second illustration, of the WLAN RF coverage map of FIG. 3 where, during a loading control procedure for the wireless APs, RF coverage areas of the neighboring wireless APs are increased.
Figure 5:
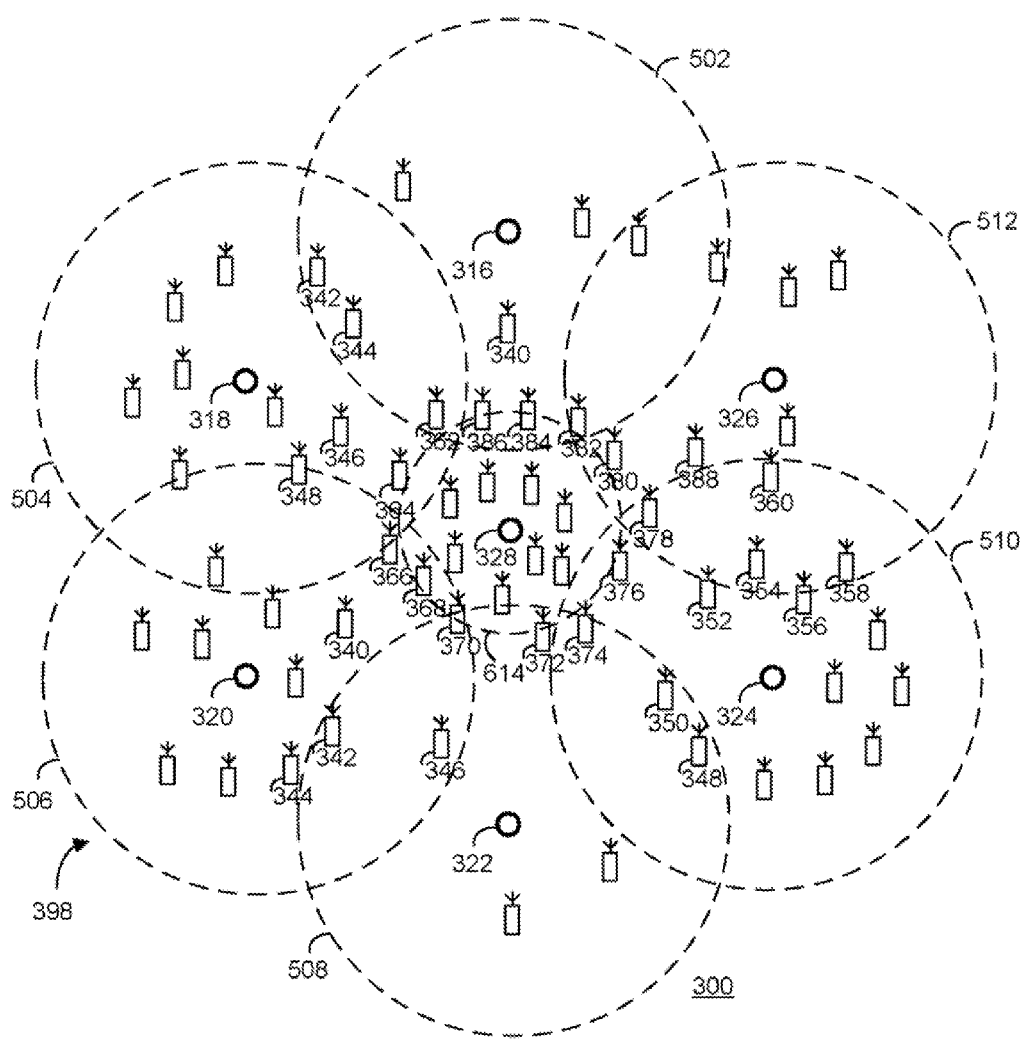
FIG. 5 is the third and final illustration of the WLAN RF coverage map of FIG. 3 where, during the loading control procedure for the wireless APs, the RF coverage area for the central wireless AP that is nearly overloaded is decreased.

FIG. 3 is the first in a series of three illustrations of FIGS. 3-5 of a WLAN 300 which utilizes techniques of the present disclosure. WLAN 300 has a plurality of wireless access points (APs) 398 which together provide a local radio frequency (RF) coverage area for WLAN 300. All wireless APs and mobile communication devices are fixedly located in the same position in each of the three illustrations of FIGS. 3-5. The numbering assignment for each AP and mobile communication device is identical throughout the illustrations. In the example shown in FIG. 3, WLAN 300 consists of seven wireless APs which provide seven RF coverage areas. Practical WLAN systems may consist of one or more wireless APs. The present disclosure is applicable to WLAN systems which consist of two or more wireless APs. Specifically in FIG. 3, wireless APs 398 of WLAN 300 include wireless APs 316, 318, 320, 322, 324, 326, and 328.

In FIG. 3, wireless AP 328 is centrally located and wireless APs 316, 318, 320, 322, 324, and 326 surround wireless AP 328 and may be said to be adjacent or neighbor the wireless AP 328. As part of the entire RF coverage area of WLAN 300, wireless AP 316 provides an RF coverage area 402, wireless AP 318 provides an RF coverage area 404, wireless AP 320 provides an RF coverage area 406, wireless AP 322 provides an RF coverage area 408, wireless AP 324 provides an RF coverage area 410, wireless AP 326 provides an RF coverage area 412, and wireless AP 328 provides an RF coverage area 414.

Within WLAN 300, each RF coverage area has a size that is set based on the assumption that each wireless AP is transmitting a nominal RF transmission power level. Here, a "nominal" RF transmission power level is an. RF transmission power level of the wireless AP which is less than its maximum RF transmission power level and preferably provides efficient transmitter power performance as well as a desired RF coverage area. For example, the nominal RF transmission power level may be an average or medium RF transmission power level of the wireless AP.

Each RF coverage area in FIG. 3 is shown to be circular and equal in diameter to each other. Due to RF propagation affects mentioned earlier and the presence of RF absorbers and reflectors, it is unlikely in actual practice that each RF coverage area will be equal and be shaped like a perfect circle. In actual practice, RF coverage areas vary slightly from a perfect circular RF coverage area depending on RF propagation affects within the RF coverage area of the wireless AP. Only for illustrative purposes as shown, each RF coverage area covers an equal geographic area unless the transmitted RF transmit power level is varied, and is circular. Circular RF coverage areas in FIG. 3 have overlapping areas as shown. In practical applications, the overlapping areas shown in FIG. 3 may be greater or lesser, depending on communications systems design requirements. A certain amount of RF coverage overlap area will exist in any wireless network for the purpose of providing continuous service within the system RF coverage area.

Again, RF coverage areas 402, 404, 406, 408, 410, 412, and 414, together make up at least part of the entire RF coverage area of WLAN 300. When within the RF coverage area of the WLAN 300, mobile communication devices are provided with wireless communications and may access communication services within it. Outside of the RF coverage area of the WLAN 300, the mobile communication devices may not be able to communicate through or access services of WLAN 300. In this example, all of the mobile communication devices shown are within the RF coverage area of WLAN 300. WLAN 300 and its mobile communication devices may operate according to 802.11-based communication standards.

WLAN 300 shown contains mobile communication devices within each RF coverage area. The number of mobile communication devices using each wireless AP and associated traffic within that wireless AP's RF coverage area will vary throughout each day and will change over time. The example shown in FIGS. 3-5 may be representative of a WLAN RF coverage area of a typical office building during a particular normal operating time of the day. The present disclosure describes techniques that address various loading of individual wireless APs within a WLAN, how excessive loading on any wireless AP can affect system performance, and an approach that will alleviate excessive loading on any given wireless AP. Mobile communication devices may operate in, around and outside of the RF coverage area of WLAN 300.

System performance provided to any mobile communication device within a WLAN will be compromised once system capacity is exceeded on a wireless AP which is providing service to the mobile communication device. Uncompromised system performance may be related to a quality of service (QoS) offered for each, device through the WLAN. Uncompromised service or QoS translates into the highest probability of data packets successfully traveling from, origination to destination, (e.g. wireless AP to mobile communication device, and mobile communication device to wireless AP), which translates to low or no added distortion or delays in expected communications. Traffic demands by each mobile communication device may also dictate the maximum number of mobile communication devices that may be serviced by the AP at any given time. If some mobile communication devices are simultaneously downloading streaming video or new software applications, for example, the data rate and bandwidth demands on the wireless AP are greater than if all the mobile communication devices are operating in conventional data messaging, email or voice communications modes.

In conventional WLAN techniques, once a wireless AP has reached its capacity, additional mobile devices may still be allowed to associate with the wireless AP. Once wireless AP system capacity is met or exceeded, the wireless AP may continue to provide service to each active mobile communication device, but decrease the data rate and/or bandwidth allocation used to provide service to each mobile communication device. This is undesirable because the expected QoS for a given client may be unnecessarily compromised. If measures are not appropriately taken, however, data throughput will suffer.

According to the present disclosure, a predetermined threshold corresponding to a (near) maximum wireless AP loading is utilized for loading control. The predetermined threshold will initiate a process which will relatively decrease the loading on an overloaded wireless AP. Physical limitations for wireless AP capacity are dependent on system bandwidth and data rates, for example. At any given time, the loading of a wireless AP is a function of traffic and QoS demands from each mobile communication device within the AP's RF coverage area.

In the present example, a number of mobile communication devices is used as an illustrative indication to the reader as an estimate of the wireless AP loading capacity. In actual practice, the amount of traffic and/or QoS requirement may be utilized. Thus, for purposes of illustration, the predetermined threshold for the present example will be set to fifteen (15) mobile communication devices per each wireless AP RF coverage area. In practice, this threshold of mobile communication devices per RF coverage area may be much greater or less, depending on the capabilities of each wireless AP and bandwidth demands for each mobile communication device.

The number of mobile communication devices communicating via each wireless AP, which is an illustrative indication of the loading of each wireless AP, is now described in relation to FIG. 3. At one point in time, RF coverage area 402 is occupied by mobile communication device 330 and three additional unnumbered mobile communication devices as shown (i.e. total number of four mobile devices communicating via wireless AP 316). Mobile communication devices that are unnumbered are shown to indicate additional loading within each wireless AP RF coverage area, but otherwise are not a pertinent part of the discussion. RF coverage area 404 is occupied by mobile communication devices 332, 334, 336, and 338, and six additional mobile communication devices (i.e. total number of ten mobile devices communicating via wireless AP 318). RF coverage area 406 is occupied mobile communication devices 340, 342, and 344, and seven additional mobile communication devices (i.e. total number of ten mobile devices communicating via wireless AP 320). RF coverage area 408 is occupied by mobile communication device 346 and two additional mobile communication devices (i.e. total number of three mobile devices communicating via wireless AP 322). RF coverage area 410 is occupied by mobile communication devices 348, 350, 352, 354, 356, 358, and six additional mobile communication devices (i.e. total number of twelve mobile devices communicating via wireless AP 324). RF coverage area 412 is occupied by mobile communication devices 360 and 388, and four additional, mobile communication devices (i.e. total number of six mobile devices communicating via wireless AP 326). RF coverage area 414 is occupied by mobile communication devices 362, 364, 366, 368, 370, 372, 374, 376, 378, 380, 382, 384, 386 and eight additional mobile communication devices (i.e. total number of twenty-one mobile devices communicating via wireless AP 328). The number of mobile communication devices in each of the seven APs in the example of FIG. 3 is summarized in Table 1 below.

TABLE 1

Initial Wireless AP Loading within the WLAN

| | Wireless AP from FIG. 3 | | | | | | |
|---|---|---|---|---|---|---|---|
| | 316 | 318 | 320 | 322 | 324 | 326 | 328 |
| Mobile Communication Devices per AP | 4 | 10 | 10 | 3 | 12 | 6 | 21 |

Note that, in actual practice, the capacity of wireless APs may allow for dozens of mobile communication devices to hundreds of mobile communication devices. For purposes of illustration, fewer mobile communication devices are shown In the diagrams of FIGS. 3-5.

In this example, wireless AP 314 is providing service to twenty-one mobile communication devices, which exceeds the threshold for wireless AP loading capacity of fifteen by six mobile communication devices. For simplification of illustration, only one of the seven APs is shown to be overloaded. In actual practice, no wireless APs may be loaded to or above capacity, any one of the wireless APs may be loaded to or above capacity, or two or more wireless APs may be simultaneously loaded to or above capacity. Operation in excess of wireless AP loading capacity will necessitate that some or all of the mobile communication devices operating within RF coverage area 414 will experience degraded performance in the form of decreased data rates, decreased allocated bandwidth, or blocked calls, for example, unless some process is in place to reduce the loading on wireless AP 328. In contrast, the techniques of the present disclosure provide for the adjustment of transmission power of the wireless APs so that mobile communication devices may be reassigned from the loaded wireless AP to other not-so-heavily-loaded wireless APs. Each wireless AP is provided with an RF power amplifier (PA) which is controlled accordingly.

As described earlier, a method of controlling AP RF coverage areas, and effective loading, by controlling RF transmit power levels of an overloaded AP and its neighboring APs is utilized in WLAN 300. In order to provide continuous service to all mobile communication devices associated with WLAN 300, any change in AP RF transmit power level will have to be performed without creating any voids in the RF coverage area. A goal in the load reducing process is to reduce the RF transmit power level of overloaded wireless AP 328 to effectively reduce the client loading. RF coverage area is a function of AP RF transmit power level. Reducing RF transmit power level on any wireless AP will decrease its RF coverage area and effectively reduce client loading within a geographical area. A number of relatively small RF power level reductions for the wireless AP may be made over a period of time for the reduction of AP loading. In one variation, a first step which increases the RF transmit power level on one or more of the neighboring APs may be performed to increase the surrounding RF coverage area, in order to prevent any voids within the WLAN 300 RF coverage area.

FIG. 4 is a second illustration of WLAN 300 which shows that the RF coverage areas of wireless APs 316, 318, 320, 322, 324, and 326 adjacent to overloaded wireless AP 328 have been increased. As shown in FIG. 4, each of the neighboring APs 316, 318, 320, 322, 324, and 326 is providing a larger RF coverage area, indicating that the RF transmit power level for each neighboring AP has increased by a predetermined amount. In this example, all neighboring wireless APs have increased RF transmit power level by the same amount, and are providing service to an equal RF coverage area. In this example with increased RF coverage areas of WLAN 300, wireless AP 316 provides an RF coverage area 502, wireless AP 318 provides an RF coverage area 504, wireless AP 320 provides an RF coverage area 506, wireless AP 322 provides an RF coverage area 508, wireless AP 324 provides an RF coverage area 510, and wireless AP 326 provides an RF coverage area 512. Wireless AP 328 is shown in FIG. 4 to still provide RF coverage area 414, which indicates that, the RF transmit power level generated by AP 328 is the same nominal level as that described in relation to FIG. 3.

Thus, the increased RF coverage areas in FIG. 4 create a larger RF coverage overlap area than the RF coverage overlap area from FIG. 3, where all APs were transmitting at equal and nominal RF transmit power levels. Within the RF coverage overlap areas shown in FIG. 4 are thirteen mobile communication devices 362, 364, 366, 368, 370, 372, 374, 376, 378, 380, 382, and 384 that are or were associated with wireless AP 328. In FIG. 3, the RF overlap area included ten mobile communication devices associated with AP 328. In addition, many of the ten mobile communications devices within the RF coverage overlap areas from FIG. 3 are marginally covered by neighboring APs' RF coverage areas. The RF coverage overlap areas shown in FIG. 4 include only two marginally covered mobile communication devices of the thirteen mobile communication devices within the RF coverage overlap areas.

Next, wireless AP 328 reduces its RF transmit power level by a predetermined amount to reduce its RF coverage area to thereby reduce the RF coverage overlap areas with its neighboring APs. A reduced RF coverage area 614 of FIG. 6 is thereby created by a reduced RF transmit power level which will effectively prevent current or new mobile communication devices from (re-)associating with wireless AP 328 and control the loading on wireless AP 328. Considering the likely probability that all thirteen candidate mobile communication devices within the RF coverage overlap area of FIG. 4 will be capable of a handover to a neighboring wireless AP, all thirteen, candidate mobile communication devices in this example will perform a successful handover in response to the handover indication messages without sacrificing any noticeable degradation in network availability. In this load reducing step, mobile communication devices 362, 382, 384 and 386 may handover to wireless AP 316, mobile communication device 364 may handover to wireless AP 318, mobile communication devices 366 and 368 may handover to wireless AP 320, mobile communication devices 370 and 372 may handover to wireless AP 322, mobile communication devices 374 and 376 may handover to wireless AP 324, and mobile communication devices 378 and 380 may handover to wireless AP 326.

Table 2 below shows reduced loading of FIG. 5 within RF coverage area 414, which translates to reduced loading on AP 328, from twenty-one to eight mobile communication devices.

TABLE 2

Wireless AP Loading within a WLAN after Handovers from Adjacent APs Increasing RF Transmit Power Level

| | Wireless AP from FIGS. 3, 4 & 5 | | | | | | |
|---|---|---|---|---|---|---|---|
| | 316 | 318 | 320 | 322 | 324 | 326 | 328 |
| Mobile Communication Devices per AP | 8 | 11 | 12 | 5 | 14 | 8 | 8 |

Specifically here, wireless AP 316 loading increases from four to eight mobile communication devices, wireless AP 318 loading increases from ten to eleven mobile communication devices, wireless AP 320 loading increases from ten to twelve mobile communication devices, wireless AP 322 loading increases from three to five mobile communication devices, wireless AP 324 loading increases from twelve to fourteen mobile communication devices, and wireless AP 326 loading increases from six to eight mobile communication devices. Wireless AP 328 loading of eight mobile communication devices is now well below tire threshold for wireless AP loading capacity of fifteen by seven mobile communication devices. Network availability provided to each mobile communication device associated with wireless AP 328 is now uncompromised.

In this example, the appropriate service or QoS for all mobile communication devices is achieved with one iteration of increasing RF transmit power levels on adjacent cells and reducing RF transmit power level on the overloaded wireless AP. In practical applications, two or more iterations may be necessary in order to restore uncompromised network availability to all mobile communication devices on a WLAN. Additional iterations may increase neighboring APs' RF transmit power levels by a second predetermined amount that may or may not be equal to a first predetermined amount. Additional iterations may decrease overloaded APs' RF transmit power level by a second predetermined amount that may or may not be equal to a first predetermined amount.

As apparent, the techniques do not require the functional requirements of the mobile devices to modified and therefore are suitable for use with existing legacy mobile devices. Each mobile device operates conventionally by monitoring the signal strength of the wireless AP with which it is associated and, if the signal strength drops below a predetermined threshold, then it causes a scanning operation to be performed to identify adjacent wireless APs having stronger signal strengths. The mobile device may then reassociate with one of the adjacent wireless APs that has a stronger signal strength than the current wireless AP.

As described earlier, a number of relatively small RF power level reductions for the overloaded wireless AP may be made over a period of time for the reduction of AP loading. Nonetheless, one or more of the adjacent wireless APs may become overloaded upon accepting handovers from the overloaded wireless AP. In this example, wireless AP 324 provides service to fourteen mobile communication devices after handovers are completed following the step of Increasing RF transmit power levels on neighboring wireless APs. If one more mobile communication device associates with wireless AP 324, an overload condition will then be created. In that situation, the loading process may continue with wireless AP 324 becoming the overloaded wireless AP and wireless APs 322, 326 and 328 becoming the neighboring wireless APs. The load controlling process is intended to continue until all wireless APs are providing uncompromised network availability to all mobile communication devices active on WLAN 300. Those skilled in art may realize that more sophisticated software and memory storage capabilities will increase the probability of uncompromised network availability is provided for all mobile communication devices active on a WLAN once the present disclosure has completed all possible iterations.

As a variation of the technique, the present disclosure may provide for increasing RF transmit power levels on neighboring wireless APs one at a time (as opposed to simultaneous increase suggested by FIG. 4) and tallying wireless AP loading after each increase of RF transmit power level on a neighboring wireless AP. As part of this technique for increasing RF transmit power levels on neighboring wireless APs one at a time, the process refrains from decreasing RF transmit power level on an overloaded wireless AP unless all neighboring wireless APs had increased RF transmit power level by an equal amount, in order to prevent voids in RF coverage within the WLAN.

A similar technique may also be included that may fixedly set AP RF transmit power level relative to last iteration in which a handover was accepted for a mobile communication device that was previously associated with an overloaded wireless AP. One similarity between such a technique and the above technique for increasing RF transmit power levels on neighboring wireless APs one at a time, is that a minimum RF transmit power level of the overloaded wireless AP would be limited to a RF transmit power level on the overloaded wireless AP that would correspond with a second minimum RF transmit level of neighboring wireless APs upon completion of the process. For instance, if a load reducing process requires five iterations in order to restore uncompromised network availability to all mobile communication devices active on a WLAN, and one neighboring wireless AP last accepted a handover from an overloaded wireless AP during a second of the five iterations, RF transmit power level on that neighboring wireless AP may be then fixedly set to the RF transmit power level from the second of five iterations. In order to maintain continuous coverage within WLAN RF coverage area, the overloaded wireless AP would then also be set to an RF transmit power level from the second of five iterations. Such a technique may decrease RF transmit power level on one or more wireless APs within the WLAN during overload conditions, reducing equipment stress on each wireless AP which is set to an RF transmit power level that is less than the maximum RF transmit power level of all neighboring wireless APs.

Additional techniques to the present disclosure may include defining limits on a maximum and a minimum RF transmit level for each wireless AP within a WLAN. Those skilled in art will realize the physical limitations on RF transmit components and how such limitations will insure network availability provided to all mobile communication devices active on a WLAN.

In some applications, techniques for restoring nominal RF transmit power levels to all wireless APs within the WLAN may be included. For example, this may be done when it is detected that a reduced loading exists on all wireless APs for a predetermined amount of time. Specifically, for example, a coffee shop may have two or more wireless APs within a WLAN to provide service to its customers during daily business hours of operation. Overload conditions may occur on one or more of the wireless APs during peak business hours which will trigger a load reducing process previously described. In absence of overload conditions, such as non-peak business hours and while the business is closed for business, all AP RF transmit power levels may be restored to nominal value. Operating an RF transmit circuit at RF transmit power levels greater than a nominal level will normally add additional stress to transmitter components as compared to operating an RF transmit circuit at RF transmit power levels of nominal or less than nominal values. In order to operate transmit equipment most efficiently and achieve more life from the transmit equipment, nominal or less than nominal RF transmit power levels are preferred when possible.

In FIG. 6, a flowchart of a method of controlling the loading on the wireless APs in the WLAN with use of a centralized approach is shown. The following description of FIG. 6 relates to the description of FIGS. 3-5 above. The method of FIG. 6 may be embodied at least in part as a computer program product, which includes a computer readable medium and computer instructions stored in the computer readable medium which are executable by one or more processors of a transmission control equipment or server of a WLAN (e.g. transmit control server 128 of FIG. 1) for performing the method. After its initiation, the technique is performed automatically by the one or more processors without further user intervention.

Beginning at a start block 602 of FIG. 6, the transmission control equipment will identify the loading of wireless APs due to traffic of all active mobile communication devices (sometimes referred to as clients or active clients) associated with the wireless APs of the WLAN (step 604 of FIG. 6). The loading of the wireless AP is related to the current or average capacity used due to traffic demands. If no wireless APs are nearly overloaded (as tested at step 606 of FIG. 6), the equipment continues monitoring AP loading. If any wireless APs are nearly overloaded (i.e. near full capacity) at step 606, a process will be initiated to reduce the loading on the (nearly) overloaded wireless AP. The process is an iterative loop that will increase the RF transmit power level on adjacent wireless APs, and decrease the RF transmit power level on the overloaded wireless AP, in order to reduce the loading on the overloaded AP.

In particular, if any overloaded wireless APs exist within the WLAN at step 606, a test will identify whether any wireless APs are set to a maximum RF transmit power level (step 608 of FIG. 6). If any wireless APs within the WLAN are set to a maximum RF transmit level at step 608, a flag or other indication will be set to indicate that the one or more of the wireless APs are set to maximum RF transmit power level (step 618 of FIG. 6). This is done so that the RF transmission power of these wireless APs will not be subsequently increased. Next, the transmission control equipment within the WLAN will instruct some or all wireless APs to increase RF transmit power level by a predetermined amount (step 610 of FIG. 6). See earlier discussion in relation to previous FIGS. 3-4. Preferably, the predetermined amount of change in power level is set to be relatively small. The instruction may be embodied in a message sent from the transmission control equipment to the wireless AP.

Next, a test will identify whether the overloaded wireless AP is set at its minimum RF transmit power level (step 612 of FIG. 6). If the overloaded wireless AP is already set to its minimum RF transmit level at step 612, the process will return to monitoring the AP loading at step 604. If the overloaded wireless AP is not set to minimum RF transmit power level, the process will instruct the overloaded wireless AP to reduce its RF transmit power level by a predetermined amount (step 614 of FIG. 6). See the earlier discussion in relation to the previous FIGS. 4-5. Again, the predetermined amount of change in power level is kept relatively small, and the instruction may be embodied as a message sent from the transmission control equipment to the wireless AP (assuming the centralized approach is utilized). Next, the controller causes a delay in time to occur so that mobile device handovers may occur (step 616 of FIG. 6). This is the last step of the flowchart of FIG. 6.

The next step in the process is to return to the first step of the loop to check for any overloaded wireless APs (again at step 604 of FIG. 6). This repetitive process will continue until either all wireless APs are operating below the threshold for AP loading capacity, the adjacent wireless APs are set to their maximum RF transmit power level, the overloaded wireless AP is set to minimum RF transmit power level, or the previously-overloaded wireless AP loading has been reduced to a minimum loading of mobile communication devices.

As mentioned earlier, the WLAN technique of the present disclosure does not require the functional requirements of the mobile devices to modified and therefore are suitable for use with existing legacy mobile devices. Each mobile device operates conventionally by monitoring the signal strength of the wireless AP with which it is associated and, if the signal strength drops below a predetermined threshold, then it causes a scanning operation to be performed to identify adjacent wireless APs having stronger signal strengths. The mobile device may then reassociate with one of the adjacent wireless APs which has a stronger signal strength than the current wireless AP.

The method in relation to the flowchart of FIG. 6 was directed to a centralized approach where transmission control equipment coordinated the transmissions of the wireless APs of the WLAN. An alternative approach is a distributed, non-centralized approach where wireless APs of the WLAN operate independently and autonomous using similar or the same techniques as described herein. Each wireless AP has a wireless transceiver which includes an RF power amplifier, and one or more processors which are operative to perform such autonomous control.

In a distributed and non-centralized approach, each wireless AP of the WLAN maintains its own current or average capacity corresponding to traffic of mobile devices associated with it. The adjacent wireless APs of the WLAN periodically or asynchronously communicate their known capacity to one another in messages between each other. Other information in such messages may be included as well, such as AP identifications (e.g. BSSIDs) and current transmission power level. In response to detecting a near-overload condition with its own traffic (i.e. AP capacity>threshold), the overloaded wireless AP causes its own RF transmission power level to be reduced in a plurality of small steps over a period of time. In response to detecting a near-overload condition of one of its adjacent wireless APs (i.e. neighbor AP capacity>threshold), the wireless AP may cause its own RF transmission power level to be increased in a plurality of corresponding small steps over the period of time. Such technique is performed continuously during WLAN operation, so that the wireless APs are available for mobile devices and available provide the required QoS for each mobile device. As apparent, in this distributed, non-centralized approach, the wireless APs of the WLAN operate to control their RF transmission power level independently and autonomously from each other for load control.

Note that the inventive techniques described herein may be considered or referred to as more of an overload prevention technique rather than a load balancing technique. A load balancing technique, by definition, may attempt to reach a potential convergence within the system where all AP RF coverage areas would provide service for nearly the same number of mobile communication devices. In the present disclosure, the techniques are utilized to reassign mobile communication devices from an overloaded RF coverage area to a less loaded neighbor AP RF coverage area. A load balancing process may reassign mobile communication devices to neighbor AP RF coverage areas regardless of the overload condition. Load balancing in itself may or may not be necessary due to the physical capabilities of a network. AP and its ability to provide maximum service to the mobile providers until the maximum capacity of mobile communication devices or data rate and bandwidth available is reached or exceeded.

Thus, methods and apparatus for use in controlling the loading of wireless access points (APs) of a wireless local area network (WLAN) in support of legacy terminals have been described. The WLAN has at least a first wireless AP and a second wireless AP adjacent the first wireless AP. An indication which indicates whether a loading of the second wireless AP is greater than a predetermined threshold is communicated in the WLAN. When the indication indicates that the loading is greater than the predetermined threshold, a first nominal radio frequency (RF) transmission power of the first wireless AP is increased in order to increase a first RF coverage area of the first wireless AP. A second nominal RF transmission power of the second wireless AP is correspondingly reduced in order to reduce a second RF coverage area of the second wireless AP. In response, some of the mobile communication devices initially operating with the second wireless AP are switched to operate with the first wireless AP in order to reduce the loading of the second wireless AP. The techniques may be embodied in a centralized approach where transmission control equipment of the WLAN controls each wireless APs in this manner, or alternatively in a distributed non-centralized approach where each wireless AP acts independently and autonomously in the same or similar manner. Preferably, the techniques do not require the functional requirements of mobile devices to modified and therefore are suitable for use with existing legacy mobile devices.

The above-described embodiments of the present disclosure are intended to be examples only. Those of skill in the art may effect alterations, modifications and variations to the embodiments without departing from the scope of the application.

What is claimed is:

1. A method for capacity overload prevention of wireless access points (APs) in a wireless local area network (WLAN), the method comprising the acts of:
   monitoring, in transmission control equipment connected in the WLAN, a Quality of Service (QoS) requirement for data packet communications for mobile devices through each wireless AP of the WLAN;
   identifying, in the transmission control equipment, whether the QoS requirement for the data packet communications through each wireless AP is greater than a predetermined threshold, the predetermined threshold corresponding to a near-maximum capacity of the wireless AP where the QoS requirement for the data packet communications of the mobile devices will be compromised by decreased data rates or limited bandwidth;
   when the QoS requirement for the communications through one of the wireless APs is greater than the predetermined threshold corresponding to the near-maximum capacity of the wireless AP:
   instructing, by the transmission control equipment, a neighboring wireless AP which neighbors the wireless AP to increase its nominal radio frequency (RF) transmission power in order to increase its RF coverage area;
   instructing, from the transmission control equipment, the wireless AP to reduce its nominal RF transmission power in order to reduce its RF coverage area; and
   repeating the acts of instructing the neighboring wireless AP to increase its nominal RF transmission power and instructing the wireless AP to reduce its nominal RF transmission power, as necessary until the QoS requirement for mobile device communications through the wireless AP is below the predetermined threshold corresponding to the near-maximum capacity of the wireless AP, so that the QoS requirement for the data packet communications of the mobile devices is uncompromised.

2. The method of claim 1, wherein the act of instructing the wireless AP to reduce its nominal RF transmission power causes the loading of the wireless AP to be reduced.

3. The method of claim 1, further comprising:
   when the QoS requirement for mobile device communications through the wireless AP is less than the predetermined threshold corresponding to the near-maximum capacity of the wireless AP: refraining from performing the acts of instructing.

4. The method of claim 1, further comprising:
   wherein the WLAN and the mobile devices are operative in accordance with IEEE 802.11 standards.

5. The method of claim 1, further comprising:
   delaying in time so that mobile device handovers from the wireless AP to the neighboring wireless AP may occur; and
   repeating the acts of instructing the neighboring wireless AP to increase its nominal RF transmission power, instructing the wireless AP to reduce its nominal RF transmission power, and delaying in time, until the QoS requirement for mobile device communications through the wireless AP is below the predetermined threshold corresponding to the near-maximum capacity of the wireless AP.

6. The method of claim 1, wherein the act of instructing the wireless AP comprises the further act of sending, from the transmission control equipment to the wireless AP, a message having the instruction embodied therein.

7. The method of claim 1, wherein the act of instructing the neighboring wireless AP to increase its nominal RF transmission power comprises the further act of increasing the nominal RF transmission power to help achieve a predetermined minimum loading at the wireless AP.

8. Transmission control equipment for use in capacity overload prevention of wireless access points (APs) of a wireless local area network (WLAN), the transmission control equipment comprising:
   a network interface for coupling to the WLAN;
   one or more processors coupled to the network interface;
   the one or more processors being operative to:
      monitor a Quality of Service (QoS) requirement for data packet communications for mobile devices through each wireless AP of the WLAN;
      identify whether the QoS requirement for mobile device communications through each wireless AP is greater than a predetermined threshold, the predetermined threshold corresponding to a near-maximum capacity of the wireless AP where the QoS requirement for the data packet communications of the mobile devices will be compromised by decreased data rates or limited bandwidth;
      when the QoS requirement for the data packet communications through one of the wireless APs is greater than the predetermined threshold corresponding to the near-maximum capacity of the wireless AP:
         instruct a neighboring wireless AP which neighbors the wireless AP to increase its nominal radio frequency (RF) transmission power in order to increase its RF coverage area;
         instruct the wireless AP to reduce its nominal RF transmission power in order to reduce its RF coverage area; and
         repeat the acts of instructing the neighboring wireless AP to increase its nominal RF transmission power and instructing the wireless AP to reduce its nominal RF transmission power, as necessary until the QoS requirement for mobile device communications through the wireless AP is below the predetermined threshold corresponding to the near-maximum capacity of the wireless AP, so that the QoS requirement for the data packet communications of the mobile devices is uncompromised.

9. The transmission control equipment of claim 8, wherein the one or more processors are further operative to instruct the wireless AP to reduce its nominal RF transmission power so as to help cause the loading of the wireless AP to be reduced.

10. The transmission control equipment of claim 8, wherein the one or more processors are further operative to refrain from performing the acts of instructing when the QoS requirement for mobile device communications through the wireless AP is less than the predetermined threshold corresponding to the near-maximum capacity of the wireless AP.

11. The transmission control equipment of claim 8, wherein the one or more processors are further operative to:
   reduced the WLAN and the mobile devices are operative in accordance with IEEE 802.11 standards.

12. The transmission control equipment of claim 8, wherein the one or more processors are further operative to:
   delay in time so that mobile device handovers from the wireless AP to the neighboring wireless AP may occur; and
   repeat the acts of instructing the neighboring wireless AP to increase its nominal RF transmission power, instructing the wireless AP to reduce its nominal RF transmission power, and delaying in time, until the QoS requirement for mobile device communications through the wireless AP is below the predetermined threshold corresponding to the near-maximum capacity of the wireless AP.

13. The transmission control equipment of claim 8, wherein the one or more processors are further operative to instruct the neighboring wireless AP to increase its nominal RF transmission power to be performed prior to the act to instruct the wireless AP to reduce its nominal RF transmission power.

14. The transmission control equipment of claim 8, which comprises a server.

* * * * *